United States Patent [19]

Kashio et al.

[11] Patent Number: 4,989,705
[45] Date of Patent: Feb. 5, 1991

[54] ROTARY MEMBER WITH ONE-WAY CLUTCH

[75] Inventors: Yoshio Kashio; Masahiro Kurita; Yuji Okamoto; Mitsukazu Itayama; Masahiko Kataoka, all of Kuwana, Japan

[73] Assignee: NTN Toyo Bearing Co., Ltd., Osaka, Japan

[21] Appl. No.: 338,809

[22] Filed: Apr. 14, 1989

[30] Foreign Application Priority Data

Nov. 17, 1988 [JP] Japan .................. 63-150885

[51] Int. Cl.$^5$ .................................. F16D 3/34
[52] U.S. Cl. ........................ 192/45; 192/41 R
[58] Field of Search .................. 192/45, 41 R, 38

[56] References Cited

U.S. PATENT DOCUMENTS

| | | | |
|---|---|---|---|
| 2,684,139 | 7/1954 | Lewis | 192/45 |
| 2,699,238 | 1/1955 | Sampatalos et al. | 192/45 |
| 3,174,598 | 3/1965 | Mattson | 192/45 |
| 3,537,554 | 11/1970 | Elmore et al. | 192/45 |
| 4,660,698 | 4/1987 | Miura | 192/45 |

FOREIGN PATENT DOCUMENTS 2138082 10/1984 United Kingdom ............ 192/45

Primary Examiner—Dwight Diehl
Assistant Examiner—Andrea Pitts

[57] ABSTRACT

A rotary member as a one way clutch including an outer ring formed in its inner periphery with axial grooves each formed on its bottom with a cam surface tapered in one of the opposite directions of rotation, an outer member fixedly mounted on the outer ring and having an end wall for closing one end of the grooves, rolling elements received in the grooves and a closure member adapted to close the other end of the grooves and integrally provided on its inner surface with positioning members and biasing members adapted to be received in the grooves. The positioning members serve to hold the closure member in a fixed position relative to the outer ring. The biasing members serve to bias the rolling elements into narrower side of the cam surfaces. The grooves may have their bottom recessed to receive the positioning members therein. The closure member will thus be positively prevented from turning relative to the outer ring.

7 Claims, 5 Drawing Sheets

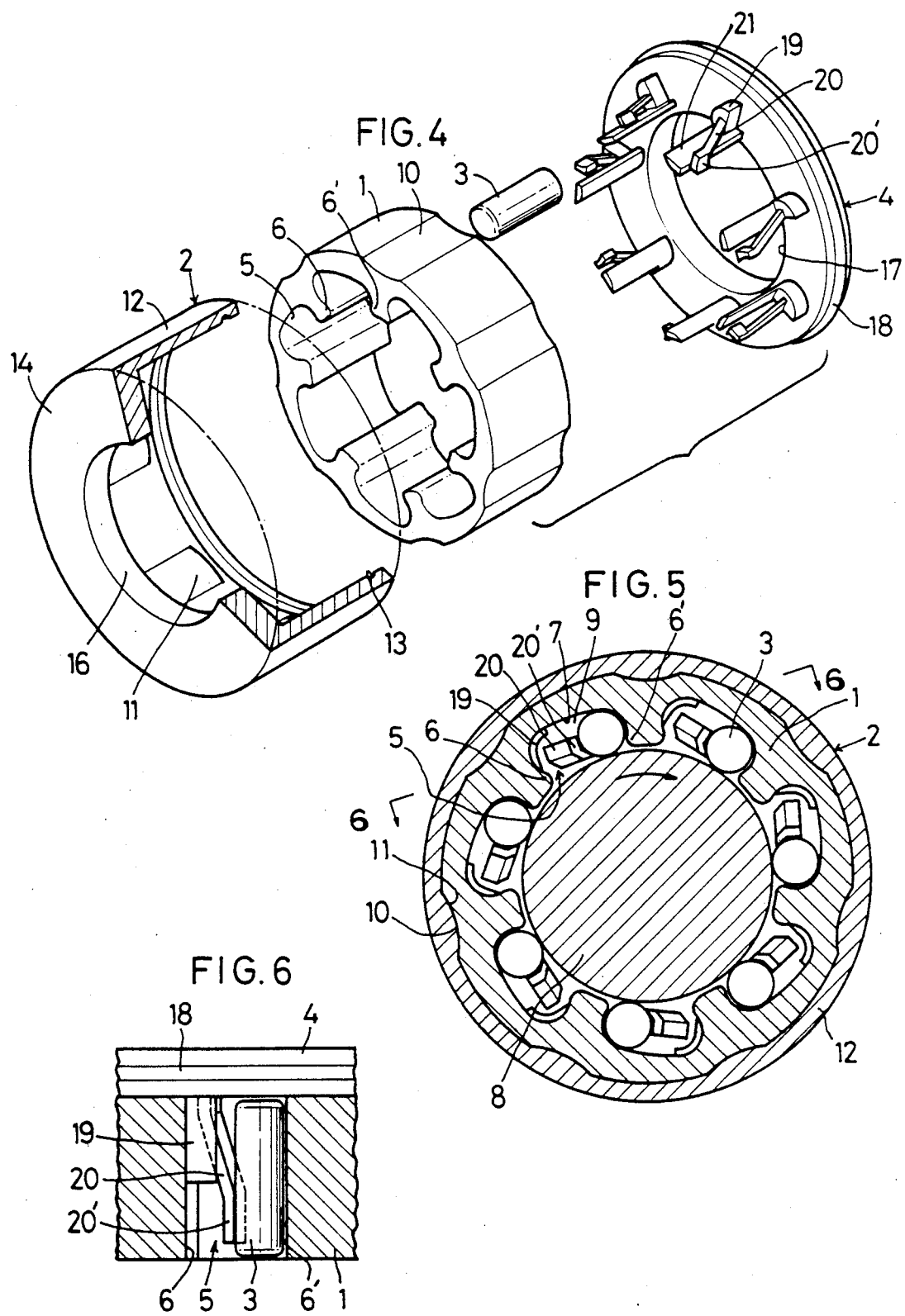

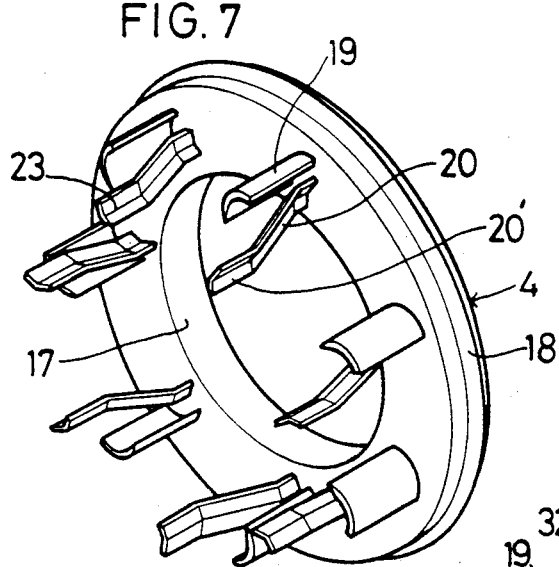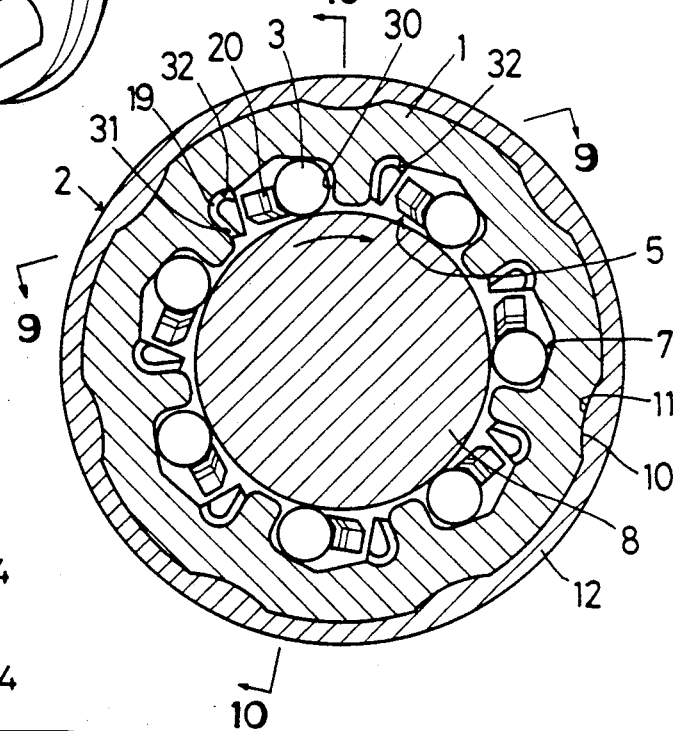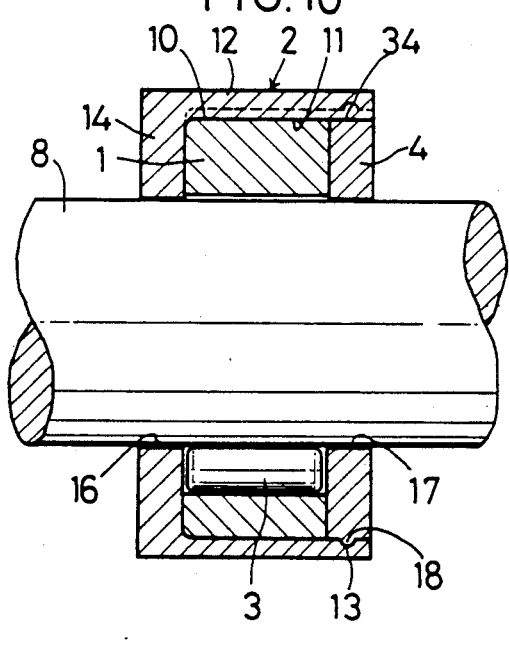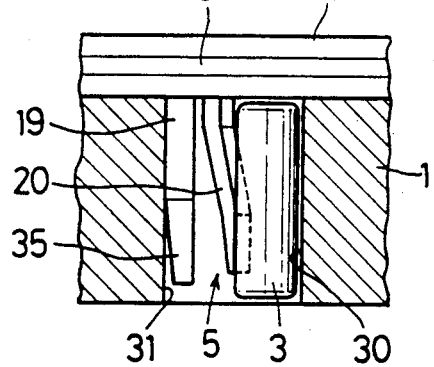

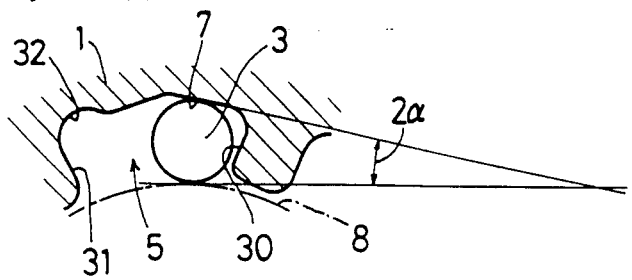
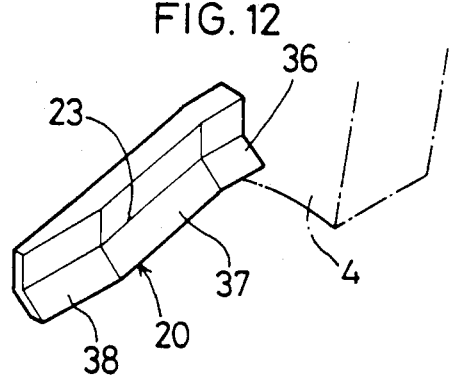
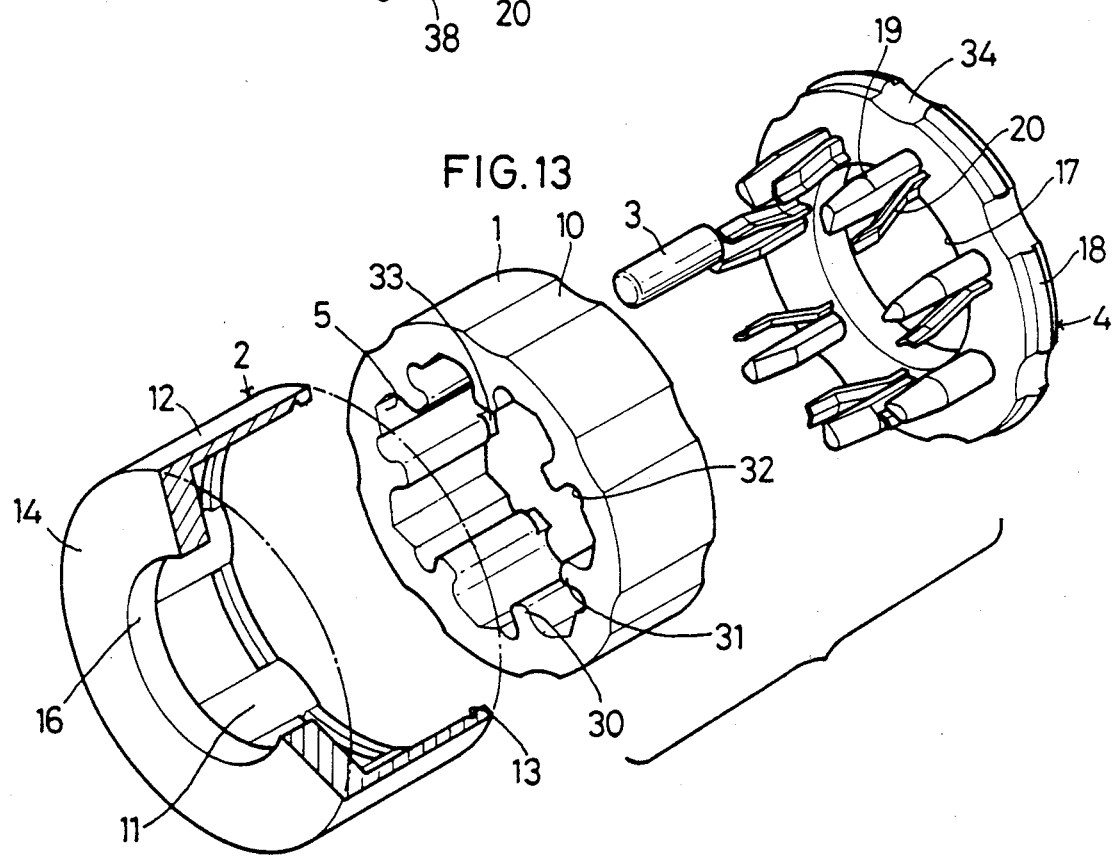

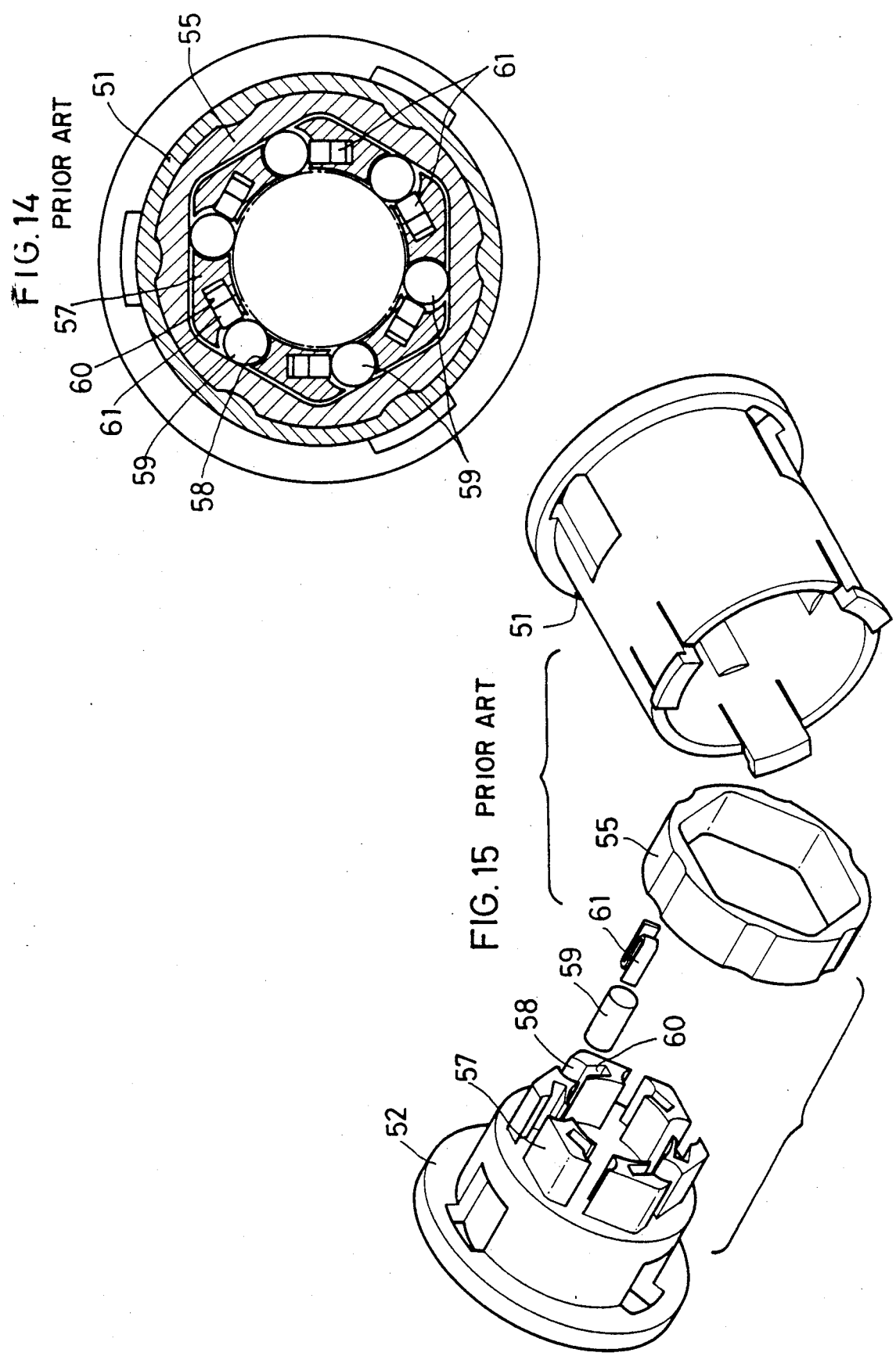

ROTARY MEMBER WITH ONE-WAY CLUTCH

The present invention relates to a rotary member such as a gear, pulley or roller having a built-in one way clutch.

A prior art rotary member with a one way clutch is shown in FIGS. 14 and 15 and disclosed in Japanese Utility Model Publication No. 61-11541. It is made up of a rather small number of parts. This rotary member has an outer ring 55 and a closure member 52 for closing one end of the outer ring. The closure member is provided on its inner surface with a plurality of cages 57. The closure member is inserted into the outer ring so that the cages will be received in the outer ring. In this state, one end of the outer ring is closed by the closure member. Then, rollers 59 are inserted into spaces 58 formed between the cages 57, and springs 61 are inserted into cutouts 60 provided in the cages and having their one side open to the respective space 58. Finally, an outer member 51 is slid over the outer periphery of the outer ring until it is snapped into engagement with the closure member, to close the other end of the outer ring with its end wall.

This rotary member includes a rather small number of parts compared with the other prior art ones because the cages are integral with the closure member and the outer ring has one end thereof closed with the end wall of the outer member. But in order to assemble such a rotary member, it is necessary to insert the compression leaf springs for the rollers into the cutouts formed in the cages one by one. It is especially difficult to assemble a rotary member because particularly with one used in an office machine its outer ring has an outer diameter of only 10 to 20 millimeters and the springs therefor are correspondingly small in size. Also, the assembly takes a long time.

It is an object of the present invention to provide a rotary member with a one way clutch which is designed so that its compression springs can be mounted quickly and easily.

The closure member and the outer ring are coupled together so that the positioning members and the biasing members will be received in the grooves in the outer ring so that one end of the outer ring will be closed by the closure member. The rolling elements are then inserted into the grooves from the other end of the outer ring, and the outer member is slid over the outer ring until the outer member and the closure members are snapped into engagement with each other.

The rotary member thus assembled is mounted on a rotary shaft. When the shaft is rotated in one direction, the rolling elements will be pushed into the narrow area of the wedge-shaped spaces, allowing the transmission of torque between the shaft and the outer ring. When the shaft is rotated in the opposite direction, the rolling elements will be pushed into the wider area of the wedge-shaped spaces against the bias of the biasing members, thus cutting off the torque transmission.

In one embodiment, the positioning members are received in the pockets formed in the bottom of the grooves of the outer ring. This will prevent the closure member from rotating with respect to the outer ring, even if the closure member is subjected to a force in the direction of rotation of the rotary shaft.

Since the positioning members and the biasing members are integrally provided on the closure member, the biasing members can be precisely set in the grooves at one time merely by inserting the closure member into the outer ring from one end thereof. Thus, the rotary member according to the present invention can be assembled much more quickly and efficiently than any prior art rotary member in which the compression springs have to be inserted into the grooves one by one.

The biasing members have contact surfaces which serve to support the rolling elements in cooperation with the cam surfaces to keep them from coming off the grooves. This eliminates the need of having the side edges of each groove overhung toward each other to keep the rolling elements from coming off, thus preventing the chipping and cracking of the side edges.

Other features and objects of the present invention will become apparent from the following description taken with reference to the accompanying drawings, in which:

FIG. 4 is a partially sectional exploded perspective view of the same;

FIG. 5 is a vertical sectional front view of the second embodiment mounted on a rotary shaft;

FIG. 6 is a sectional view of a grooved portion of the outer ring of the same taken along line 6—6 of FIG. 5;

FIG. 7 is a perspective view of the closure member of the same;

FIG. 8 is a vertical sectional front view of the third embodiment;

FIG. 9 is a sectional view taken along line 9—9 of FIG. 8;

FIG. 10 is a vertical sectional side view of the same taken along line 10—10 of FIG. 8;

FIG. 11 is a sectional view of a portion of the outer ring showing the shape and wedge angle of a wedge-like space;

FIG. 12 is an enlarged perspective view of a biasing member;

FIG. 13 is a partially sectional exploded perspective view of the third embodiment;

FIG. 14 is a sectional view of a prior art rotary member; and

FIG. 15 is an explosive view of the same.

Figure 1:
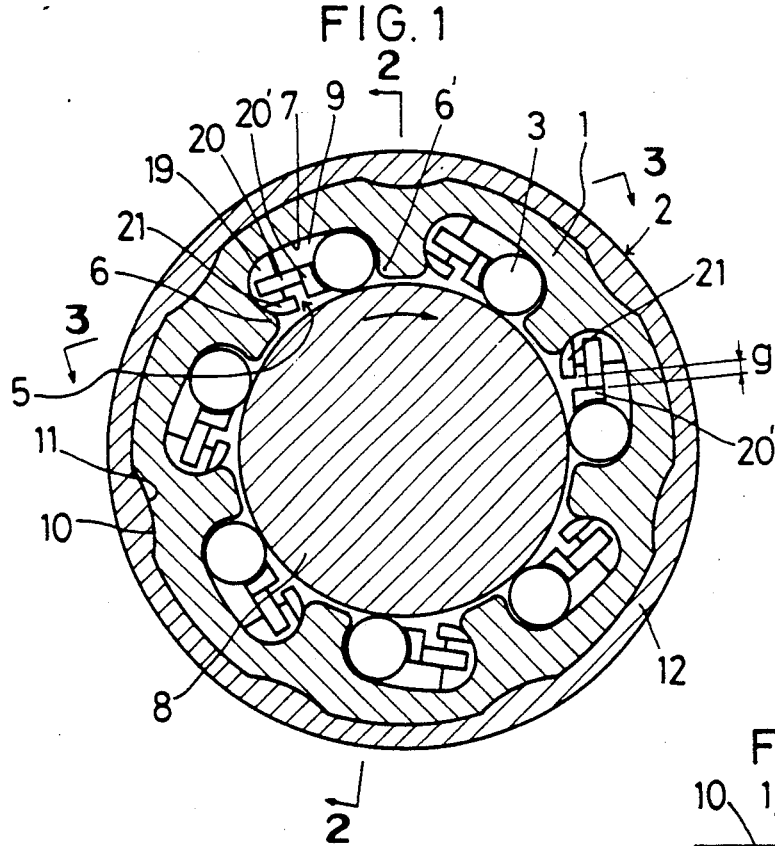
FIG. 1 is a vertical sectional front view of the first embodiment mounted on a rotary shaft.

The first embodiment of the present invention is shown in FIGS. 1 to 4, which is a rotary member in the form of a roller with a one way clutch. It comprises an outer ring 1, an outer member 2, rolling elements 3 and a closure member 4.

The outer ring 1 is made of a ferrous porous metal and is formed in its inner periphery with a plurality of axial grooves 5 as shown in FIG. 4. Each groove 5 has its both side edges 6 and 6' rounded to prevent chipping and has its bottom tapered in one of the opposite directions of rotation to form a cam surface 7. Wedge-like spaces 9 are formed between the cam surfaces 7 and a rotary shaft 8.

Further, the outer ring 1 is formed in its outer periphery with a plurality of rather shallow axial grooves 10 adapted to engage ribs 11 formed on the inner periphery of the outer member 2 mounted on the outer periphery of the outer ring to prevent the outer ring 1 and the outer member 2 from rotating relative to each other.

The outer member 2 comprises a cylindrical portion 12 having an outer roller surface (FIG. 4) and formed in its inner periphery near its one end with an annular groove 13 and a closure wall 14 integrally formed at the other end of the cylindrical portion 12. The closure wall 14 is formed in its center with a round hole 16 through which the rotary shaft 8 passes. The closure wall 14 serves to close one end of the grooves 5 formed in the outer ring 1.

Figure 2:
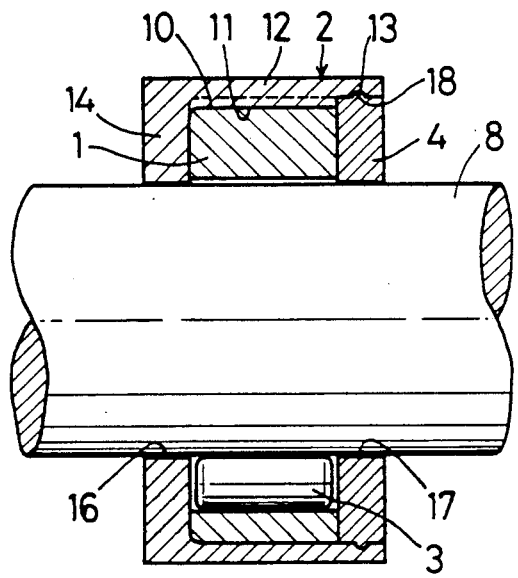
FIG. 2 is a sectional view taken along line 2—2 of FIG. 1.
Figure 3:
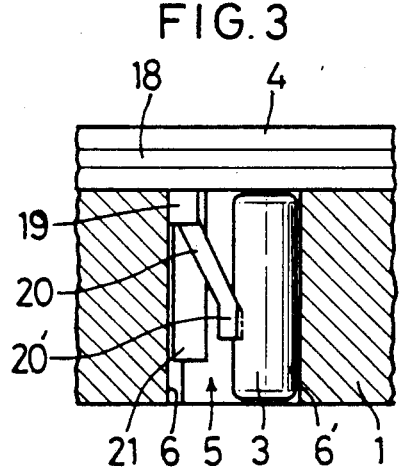
FIG. 3 is a sectional view of a grooved portion of the outer ring of the same taken along line 3—3 of FIG. 1.

A rolling element 3 in the form of a roller is inserted into each groove 5. (FIGS. 2 to 4)

The other end of each groove 5 is closed by the closure member 4 made of plastic and formed in the center with a round hole 17 through which the rotary shaft 8 passes. The round hole 17 in the closure member 4 and the other round hole 16 formed in the outer member 2 serve as radial bearings for the rotary shaft 8. The closure member 4 is formed on its outer periphery with an annular rib 18 adapted to be snapped into engagement with the annular groove 13 formed in the outer member 2.

The closure member 4 is provided on its inner surface with a plurality of sets of positioning members 19, biasing members 20 and restrictor members 21, each set being adapted to be received in the respective grooves 5 in the outer ring 1.

The positioning members 19 are inserted into the grooves 5 so as to engage their wider side walls at the side of the edges 6, thus keeping the closure member 4 in position.

The biasing members 20 are provided on top of (or, in other words, extend from) the positioning members 19 and have a base portion tapered toward the respective rolling elements 3 and a head portion adapted to be pressed against the rolling elements 3 at its contact surface 20' to bias them into the narrower area of each wedge-like space 9 with its own resilience. The contact surfaces 20' and the cam surfaces 7 serve in cooperation with each other to keep the rolling elements 3 from getting out of the grooves 5 toward the center of the outer ring 1.

The restrictor members 21 extend in the longitudinal direction of the grooves 5, keeping a distance g from the back of the contact surfaces 20'. The restrictor members 21 serve to restrict the backward motion of the biasing members 20 to a predetermined range.

In assembling the roller of this embodiment, the closure member 4 is fitted in the outer ring 1 from its one end so that the positioning members 19 and thus the biasing members 20 and the restrictor members 21 will be set in position in the respective grooves 5. The rolling elements 3 are inserted into the grooves 5 from the other end of the outer ring 1, and the outer member 2 is slid over the outer ring 1 until its groove 13 is brought into engagement with the rib 18 on the closure member 4. In this state, the biasing members 20 have their contact surfaces 20' pressed against the rolling elements 3 to bias them into the narrower area of the wedge-like spaces 9. In cooperation with the cam surfaces 7, they prevent the rolling elements 3 from getting out of the grooves 5 toward the center of the outer ring 1.

The rotary member thus assembled is mounted on the rotary shaft 8. When the shaft 8 is rotated in this state in the direction of arrow of FIG. 1, the rolling elements 3 will wedge in the wedge-shaped spaces 9, thus causing the outer ring 1 and the outer member 2 integral with the outer ring 1 to rotate with the rotary shaft 8.

When the rotary shaft 8 is rotated in the reverse direction, the rolling elements 3 will be pushed out into the wider area of the wedge-shaped spaces 9 against the bias of the biasing members 20, so that the torque of the shaft 8 will not be transmitted to the outer ring 1 and the outer members 2. The rotary member thus acts as a one way clutch.

When the biasing members 20 are pushed back by the rolling elements over a predetermined distance, they will abut the restrictor members 21 and will be stoped by them from moving back any further.

FIGS. 5 to 7 show the second embodiment of the present invention which differs from the first embodiment in the construction of the closure member 4.

Namely, in this embodiment, a plurality of sets of positioning members 19 and biasing members 20 are provided on the closure member 4 around the center hole 17 at equal angular intervals. The restrictor member 21 employed in the first embodiment are omitted.

The biasing members 20 are provided on the inner surface of the closure member 4 so as to extend obliquely toward the rolling element 3 and are formed on their head portion with a contact surface 20' so as to face the rolling elements 3. The rolling elements are supported on the contact surfaces 20' and the cam surfaces 7. The biasing members 20 are doglegged over the entire length for reinforcement and flexibility. Owing to this reinforced structure, restrictor means as the ones employed in the first embodiment are not necessary.

The rotary member of the second embodiment is assembled and used in the same manner as in the first embodiment.

In the third ebodiment shown in FIGS. 8 to 13, axial grooves 5 formed in the inner periphery of the outer ring 1 have side walls 30 and 31 arranged at front and rear of each groove, respectively, with respect to the direction of the forward rotation of the shaft 8 shown by arrow of FIG. 8. The grooves 5 are formed on their bottom near the front side walls 30 with a cam surface 7 which forms a wedge angle $2\alpha$ (about 10 degrees in this embodiment) with respect to the tangential line of the rotary shaft 8 as shown in FIG. 11. Further, the grooves 5 are formed on their bottom near the rear side walls 31 with a pocket 32 to receive each positioning member 19 which will be described later.

Also in this embodiment, the outer ring 1 is formed on its inner periphery at its one end adapted to face the closure member 4 with cutouts 33 (FIG. 13) to prevent misorientation of the outer ring 1 when assembling.

The closure member 4 is formed in its outer periphery with positoning grooves 34 having the same cross-section as the grooves 10 of the outer ring 1 and adapted to align with the grooves 10 when assembled.

On the inner surface of the closure member 4, a plurality of sets of positoning members 19 and biasing members 20 are provided, each set corresponding to the respective grooves 5 in the outer ring 1.

When assembled, the positioning members 19 will get into contact with the rear side walls 31 of the grooves 5, and be snugly received in the pockets 32 formed in the bottom of the grooves 5. This will allow the closure member 4 to be set in a predetermined position. The positioning members 19 have their outer surface at their head portions tapered to facilitate the insertion into the grooves 5. The positioning members 19 should have a length equal to or longer than the biasing members 20 to provide a before-assembly protection to the biasing members 20.

The biasing members 20 are provided inside the positioning members 19 and have a doglegged cross-section. As shown in FIG. 12, each biasing member 20 comprises a base portion 36, an intermediate portion 37 and a head portion 38. The base portions 36 extend perpendicular to the inner surface of the closure member 4, whereas the intermediate portions 37 and the head portions 38 extend obliquely as a whole toward the rolling elements 3. The head portions 38 are inclined less sharply than the intermediate portions 37 and have their inner surface extending perpendicular to the inner surface of the closure member 4 (see FIG. 9). The head portions 38 are thus thinner than the other part of the biasing members 20.

Each biasing member 20 is resilient as a whole with the spring constants of the base portion 36, the intermediate portion 37 and the head portion 38 decreasing in this order and serves to bias the respective rolling elements 3 into the narrower area of the wedge-shaped spaces having a wedge angle 2α. For higher durability and reduced stress, the base portions 36 should be made as thin as possible within the range defined by the moldability of resin. Also, the intermediate portions 37 and the head portions 38 should be tapered in such a manner as to grow thicker gradually from the tip of the head portions to the bottom of the intermediate portions to facilitate the molding of the biasing members 20.

Since the biasing members 20 have a doglegged cross-section, not only is their widthwise strength increased but also they can be stably brought into contact with the rolling elements 3 at two fixed points on the inner surface of the head portions 38.

The roller of the third embodiment is mounted on the rotary shaft 8 as shown in FIG. 8. Rotating the shaft in this state in the direction of arrow will cause the rolling elements 3 to be pushed into the narrower area of the wedge-shaped spaces, thus allowing the torque of the rotary shaft 8 to be transmitted to the outer ring 1 and the outer member 2 fixedly mounted on the outer ring.

When the rotary shaft 8 is rotated in the reverse direction, the rolling elements 3 will be pushed against the bias of the biasing members 20 into the wider area of the wedge-like spaces, thus cutting off the transmission of torque to the outer ring 1 and the outer member 2.

Since the positioning members 19 are received in the pockets 32, the closure member 4 would not be turned with respect to the outer ring 1, even if the closure member 4 is subjected to a force in the direction of rotation of the rotary shaft.

Other structures and operations in this embodiment are substantially the same as those in the first embodiment.

In the preferred embodiments, rollers with one way clutches are shown by way of example. But the rotary member according to the present invention is not limited to a roller but it may be a gear formed with rows of teeth on the outer periphery of the outer member 2, or a pulley formed with a belt guide surface on the outer periphery of the outer member 2.

What is claimed is:

1. A rotary member with a one way clutch, comprising:
    an outer ring formed in the inner periphery thereof with a plurality of axial grooves defining respective spaces for retaining a plurality of rolling elements therein, each groove having a first side wall at a narrower side of said groove and a second side wall at a wider side of said groove, such that each rolling element is retained in a corresponding one of said axial grooves, adjacent said first sidewall;
    an outer member mounted on said outer ring;
    a closure member having an end wall formed in a center thereof with a hole, said end wall of said closure member closing one end of said axial grooves, each axial groove being formed with a cam surface tapered in one of the opposite directions of rotating;
    an end wall formed in said outer member with a hole in the center thereof, said end wall of said outer member closing the other end of said axial grooves;
    positioning means, provided on an inner radial surface of said closure member and received in said respective grooves, for holding said closure member in a fixed position with respect to said outer ring;
    biasing means, integrally formed on said closure member and received in said respective grooves adjacent said second side wall thereof, for biasing said rolling elements toward said narrower side of said grooves; and
    means for coupling said closure member together with said outer member.

2. A rotary member as claimed in claim 1, wherein said outer ring is formed on the bottom of said each axial groove with a recess to receive said respective positioning means.

3. A rotary member according to claim 1, wherein said positioning means are received in said grooves engaging said second side wall thereof.

4. A rotary member according to claim 3, wherein said biasing means extend from said positioning means.

5. A rotary member according to claim 3, wherein said biasing means in provided adjacent said positioning means.

6. A rotary member according to claim 1, wherein said cam surface defines a wedge angle with respect to a line tangential to said rotary member; and wherein said grooves comprise pockets formed adjacent said second side wall thereof, said pockets for receiving said positioning means.

7. A rotary member according to claim 1, further comprising restrictor members received in said grooves and positioned behind a contact surface of said biasing means for restricting the backward motion of said biasing means to a predetermined range.

* * * * *